(12) United States Patent
Lee et al.

(10) Patent No.: US 7,891,016 B2
(45) Date of Patent: Feb. 15, 2011

(54) AUTOMATIC LANDING METHOD AND APPARATUS FOR SCANNING PROBE MICROSCOPE USING THE SAME

(75) Inventors: Haiwon Lee, Seoul (KR); Chung Choo Chung, Seoul (KR); Cheolsu Han, Suwon-si (KR)

(73) Assignee: IUCF HYU (Industry-University Cooperation Foundation Hanyang University, Seoul (KR)

( * ) Notice: Subject to any disclaimer, the term of this patent is extended or adjusted under 35 U.S.C. 154(b) by 242 days.

(21) Appl. No.: 12/225,404

(22) PCT Filed: May 29, 2008

(86) PCT No.: PCT/KR2008/003016

§ 371 (c)(1),
(2), (4) Date: Sep. 18, 2008

(87) PCT Pub. No.: WO2008/147120

PCT Pub. Date: Dec. 4, 2008

(65) Prior Publication Data

US 2009/0293160 A1    Nov. 26, 2009

(30) Foreign Application Priority Data

May 29, 2007   (KR) ..................... 10-2007-0052042
Apr. 7, 2008   (KR) ..................... 10-2008-0032371

(51) Int. Cl.
*G01Q 10/06*   (2010.01)
*G01Q 20/04*   (2010.01)
*G01B 11/08*   (2006.01)
*G01B 9/02*    (2006.01)

(52) U.S. Cl. ...................... 850/6; 850/1; 850/3; 850/4; 850/21; 356/496; 356/500; 356/501

(58) Field of Classification Search .................... 850/1, 850/2, 3, 4, 5, 6, 7, 21, 30, 33, 43, 44, 50, 850/51, 63; 356/496, 498, 499, 500, 501, 356/521; 73/105
See application file for complete search history.

(56) References Cited

U.S. PATENT DOCUMENTS 6,196,061 B1 *   3/2001   Adderton et al. .............. 73/105

(Continued)

*Primary Examiner*—Jack I Berman
*Assistant Examiner*—Nicole Ippolito Rausch
(74) *Attorney, Agent, or Firm*—Christie, Parker & Hale, LLP

(57) ABSTRACT

Disclosed herein are an automatic landing method for a scanning probe microscope and an automatic landing apparatus using the same. The method comprises irradiating light to a cantilever using a light source; collecting interference fringes generated by the light being diffracted from the edge of the cantilever and then being incident to a surface of the sample; driving the tip in the sample direction until the pattern of the interference fringes reaches a predetermined pattern region (first driving); and driving the tip in the sample direction after the interference fringe pattern reached the predetermined pattern region (second driving). The method in accordance with the present invention is very effective particularly for samples having a large surface area, because it enables automatic landing of a tip according to recognition and selection of an optimal time point for individual landing steps, irrespective of adverse changes in landing conditions, such as surface irregularities of samples. Further, the present invention enables a very inexpensive and effective application of a scanning probe microscope (SPM), because it is possible to achieve rapid and reliable driving of a tip to within an approximate distance of a sample.

13 Claims, 7 Drawing Sheets
(6 of 7 Drawing Sheet(s) Filed in Color)

U.S. PATENT DOCUMENTS

2001/0011704 A1* 8/2001 Niwa et al. .................. 250/310
2005/0117163 A1* 6/2005 Ng et al. ..................... 356/501
2007/0234786 A1* 10/2007 Moon .......................... 73/105

* cited by examiner

[FIG. 1]
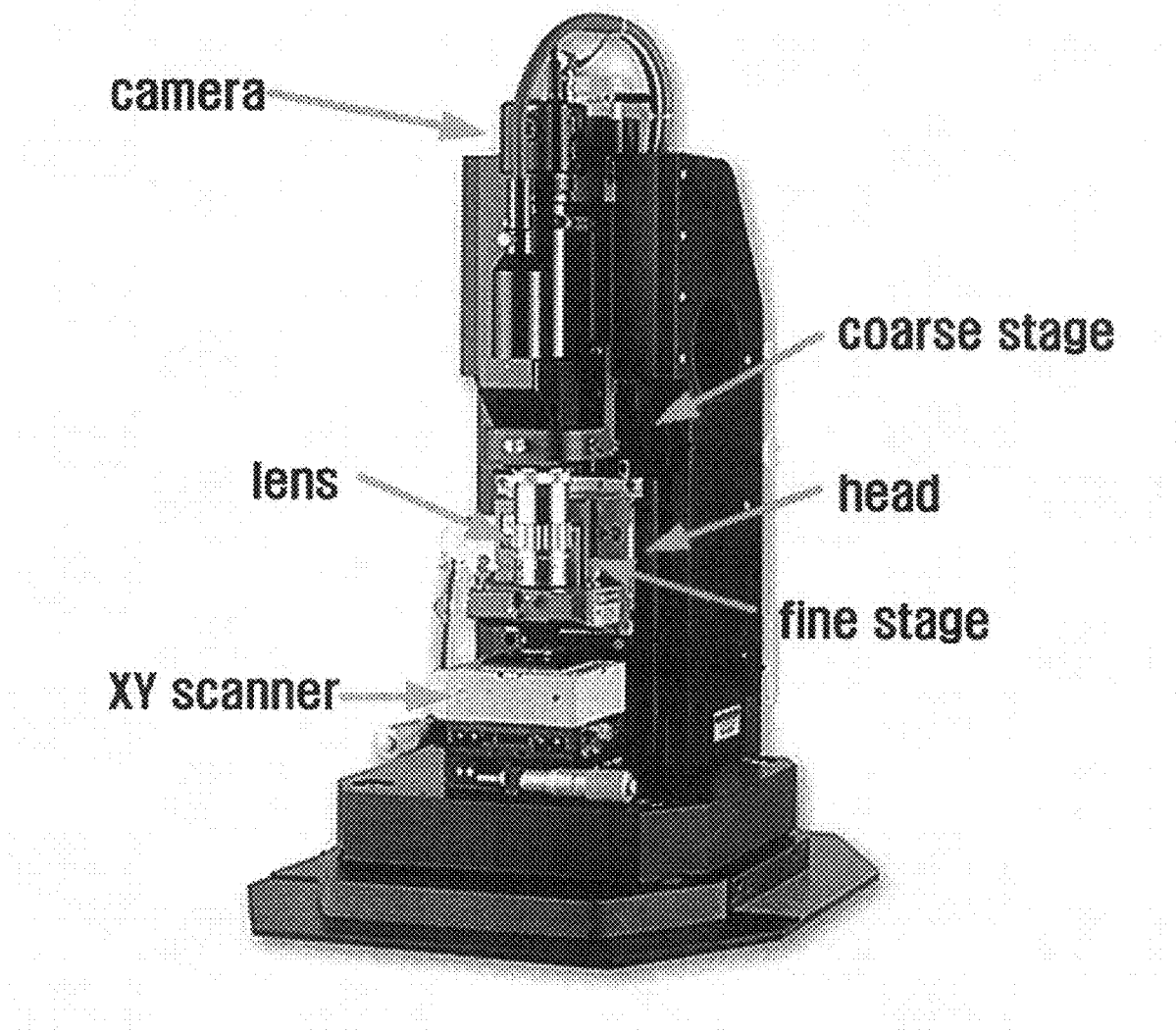

[FIG. 2]
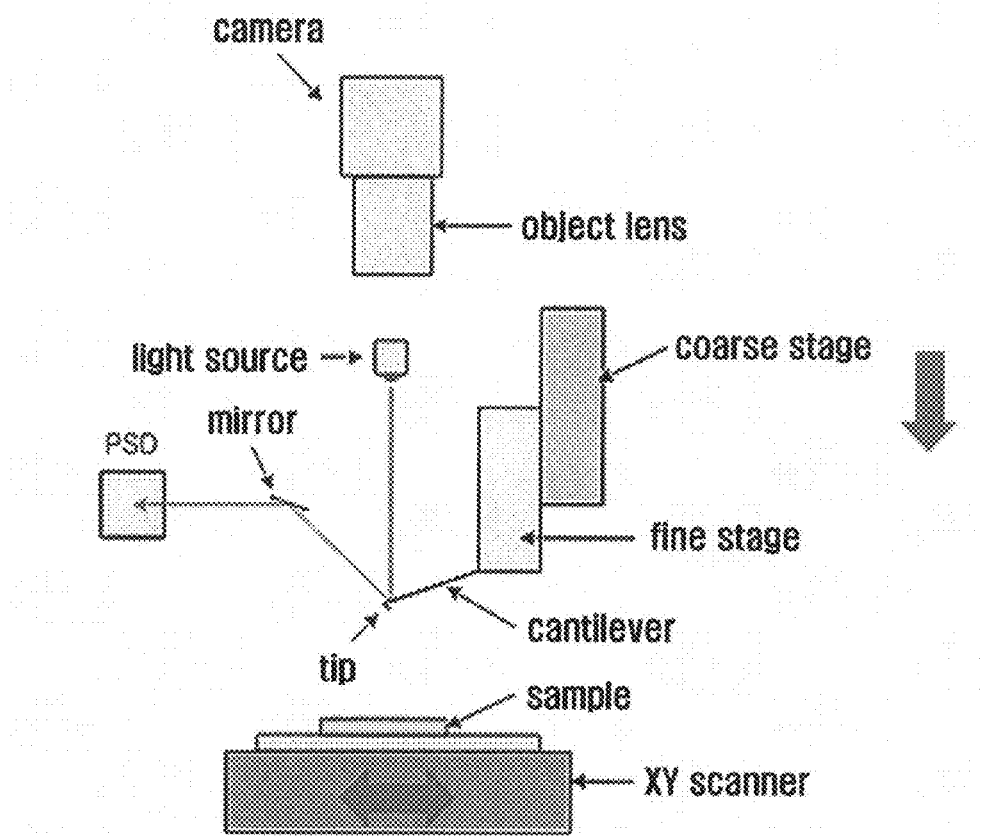
[FIG. 3]
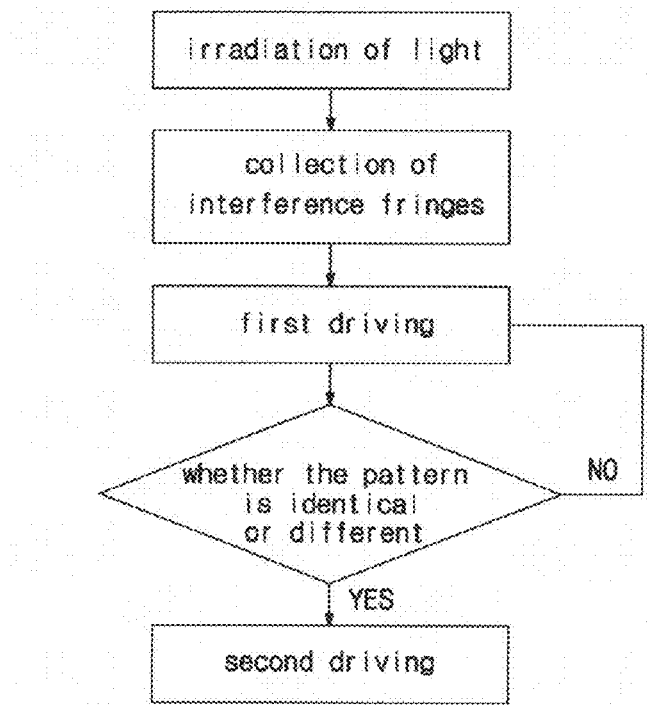

[FIG. 4]
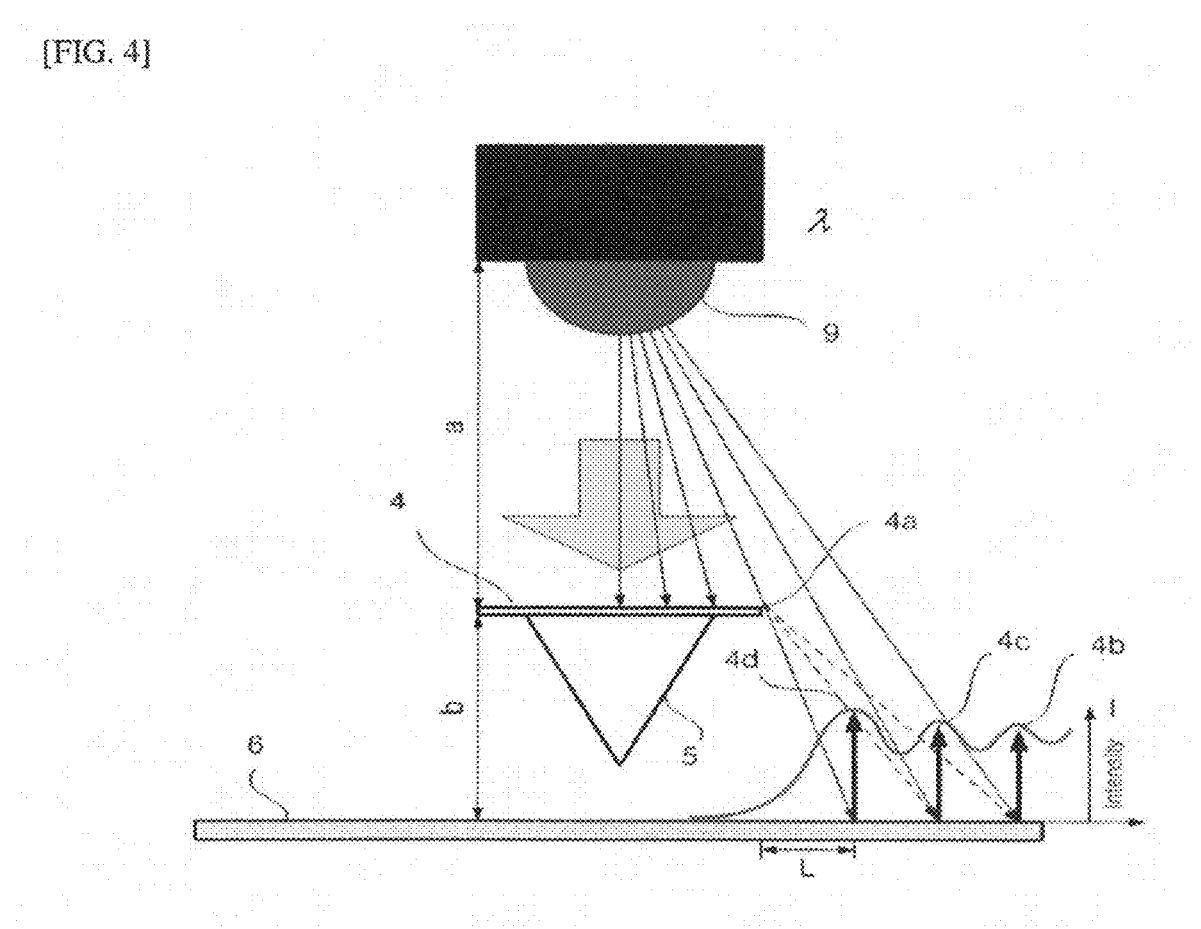

[FIG. 5a]
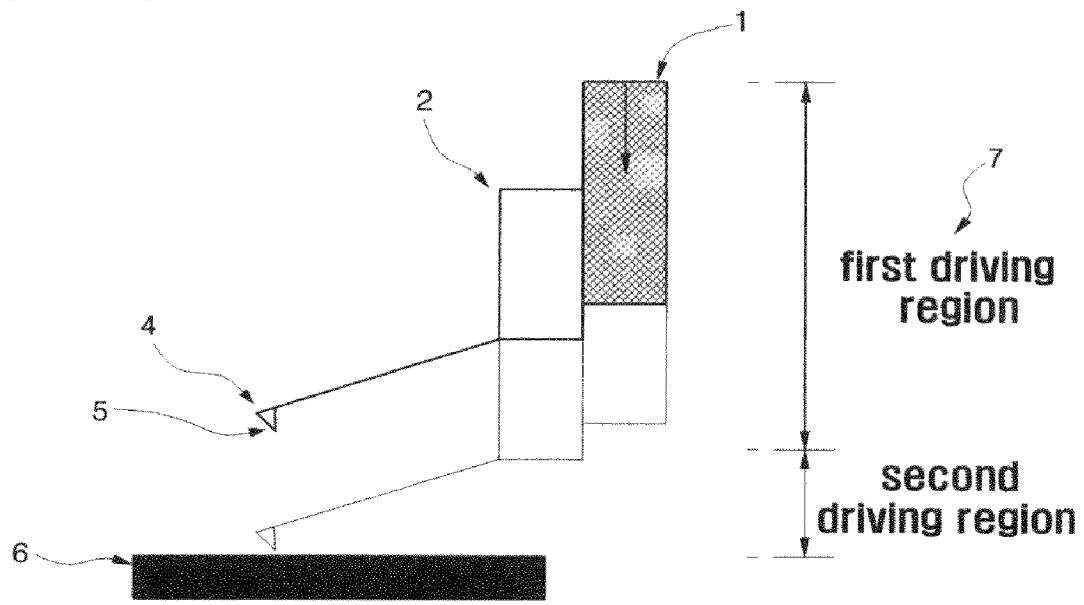
[FIG. 5b]
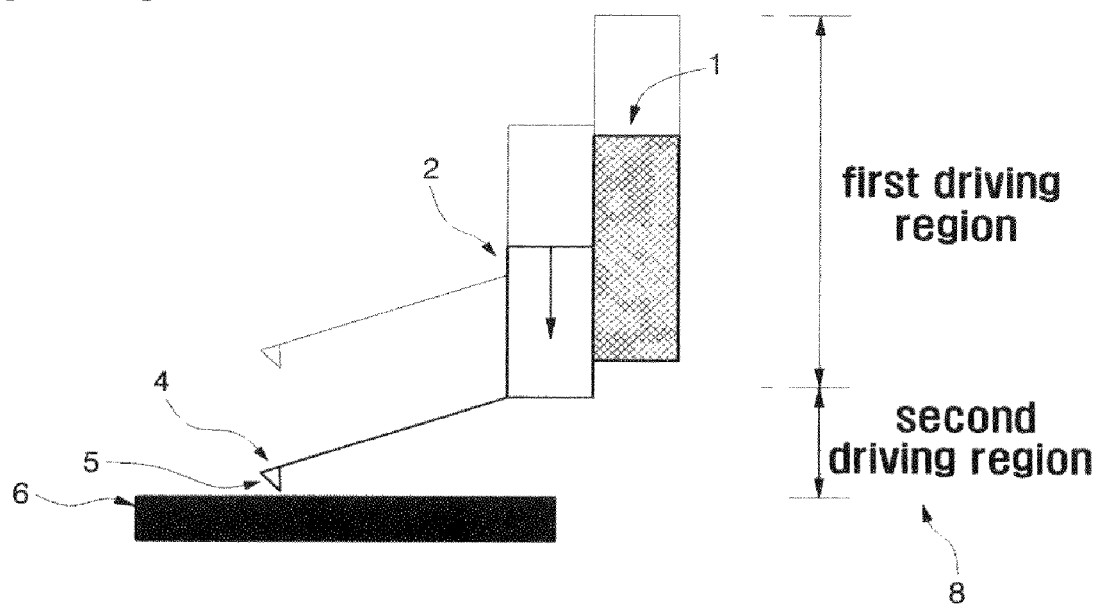

[FIG. 6]
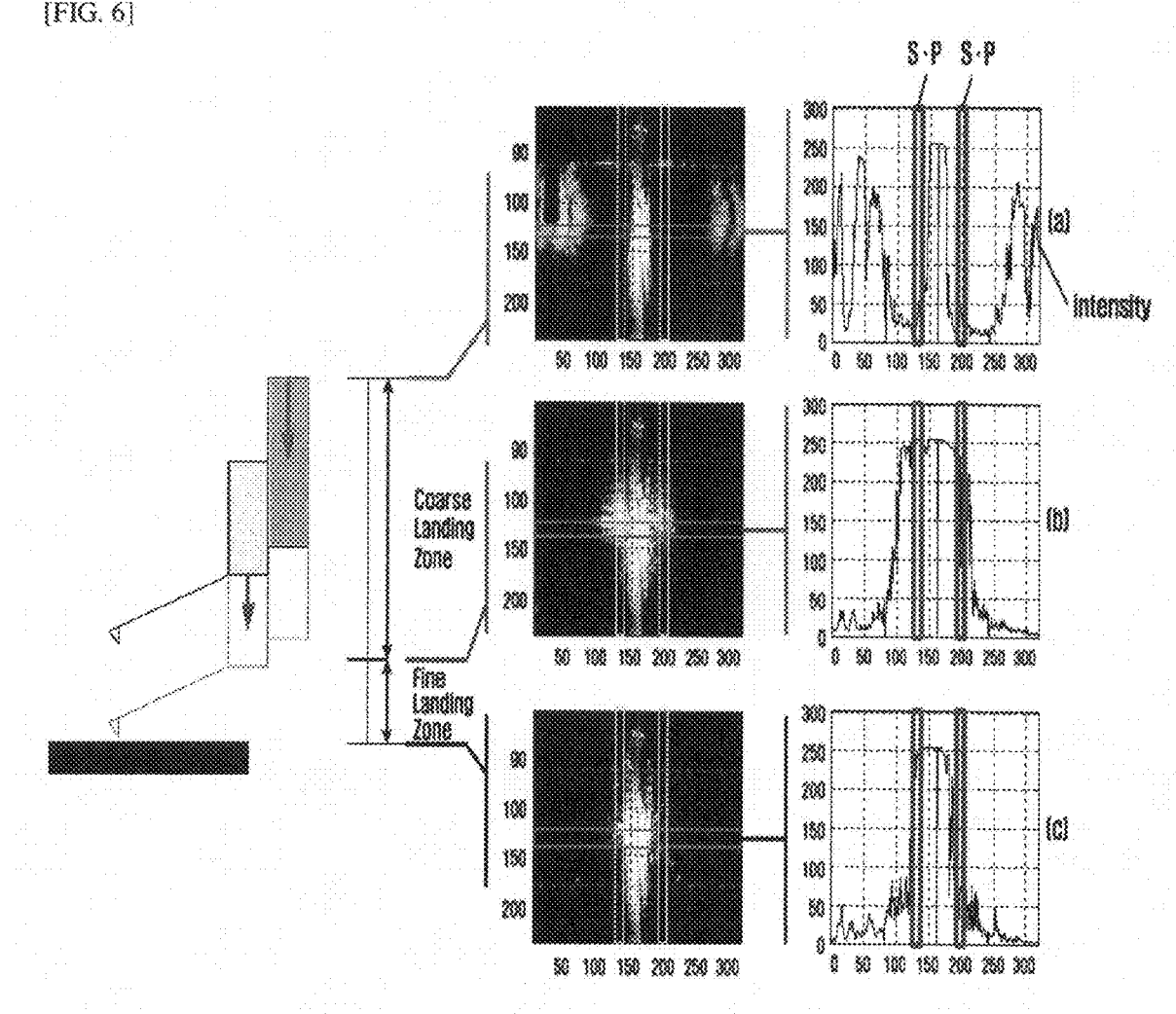

[FIG. 7a]
tip-sample distance : 1000 um
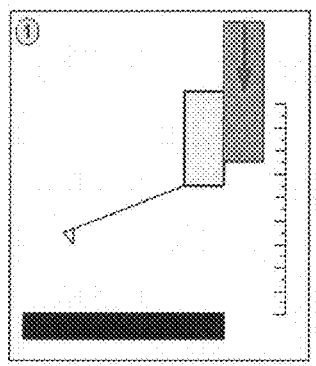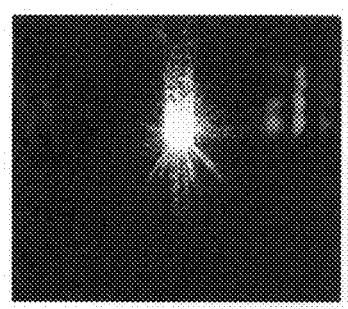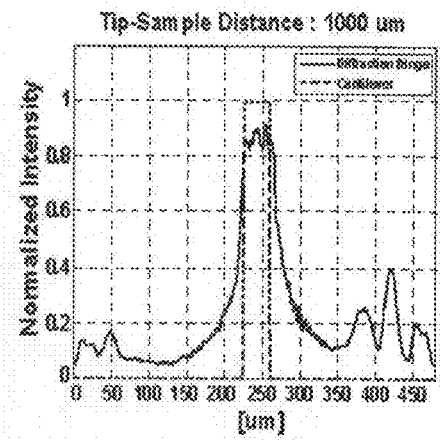
[FIG. 7b]
tip-sample distance : 500 um
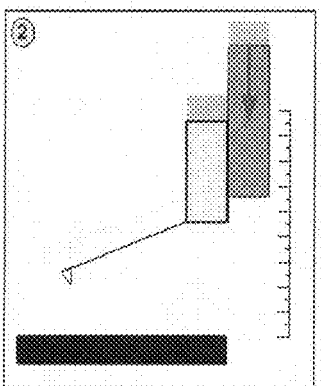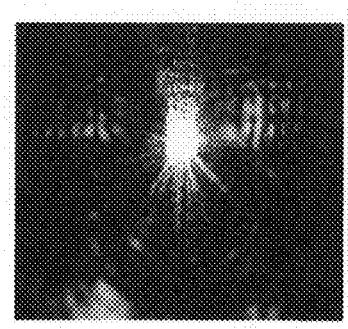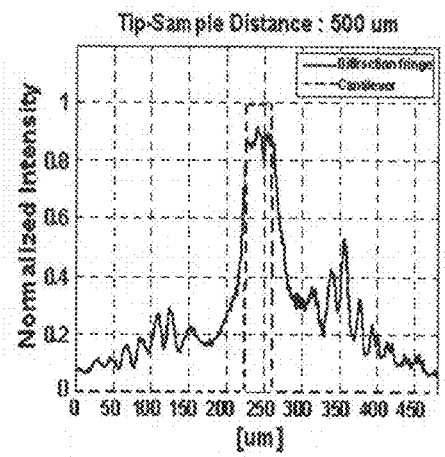
[FIG. 7c]
tip-sample distance : 100 um
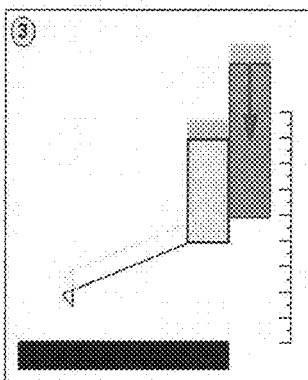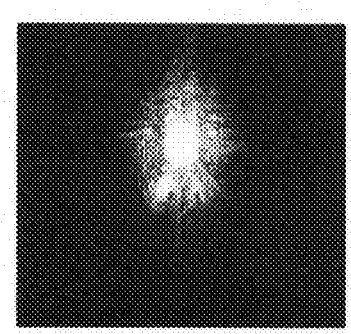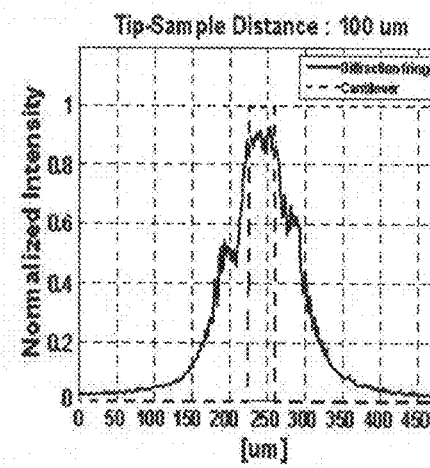

[FIG. 8a]
tip-sample distance : 400 nm
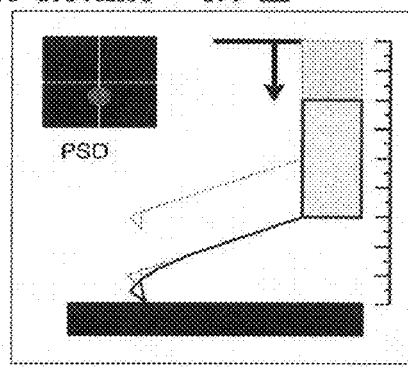
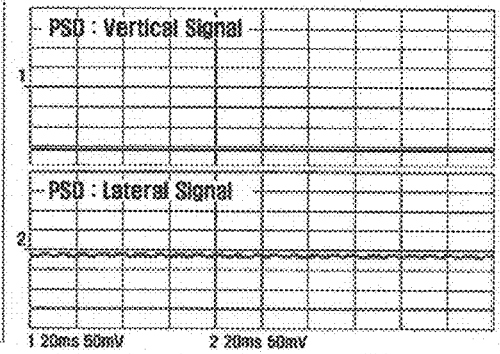
[FIG. 8b]
tip-sample distance : 0 nm
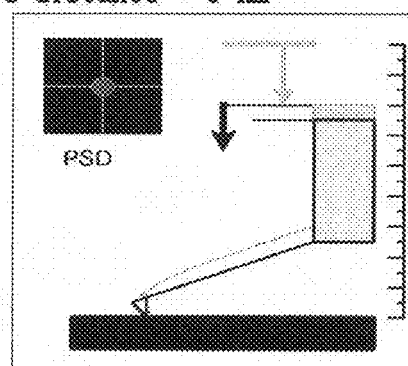
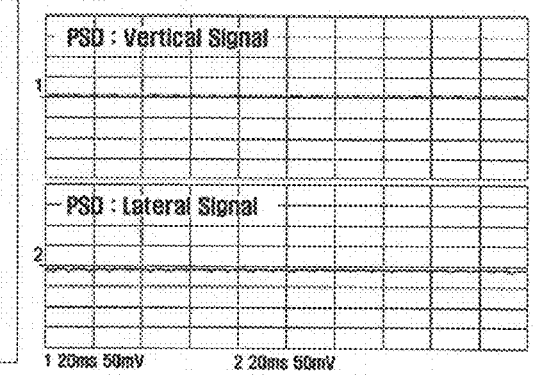
[FIG. 8c]
tip-sample distance : 0 nm
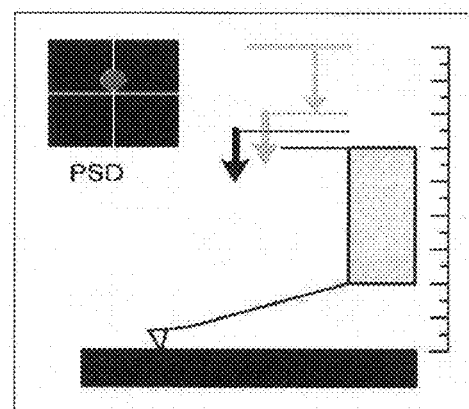
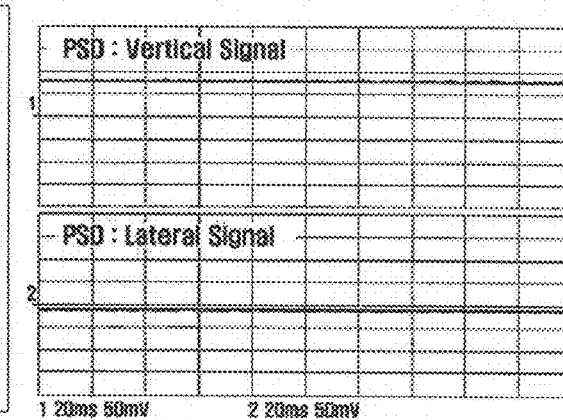

AUTOMATIC LANDING METHOD AND APPARATUS FOR SCANNING PROBE MICROSCOPE USING THE SAME

CROSS-REFERENCE TO A RELATED APPLICATION(S)

This application is a National Phase patent application of International Patent Application Number PCT/KR2008/003016, filed on May 29, 2008, which claims priority of Korean Patent Application 10-2007-0052042, filed on May 29, 2007, and Korean Patent Application 10-2008-0032371, filed on Apr. 7, 2008.

TECHNICAL FIELD

The present invention relates to an automatic landing method for a scanning probe microscope and an automatic landing apparatus using the same. More specifically, the present invention relates to an automatic landing method and apparatus, which are capable of providing effective and reliable automatic landing for a scanning probe microscope.

BACKGROUND ART

A scanning probe microscope (SPM) is a powerful tool which is capable of detecting and imaging surface morphology or physical quantities of a sample of interest by scanning the surface of a sample with a very fine tip (probe) and monitoring the strength of some interaction between the probe and surface. Depending upon kinds of the probe-surface interaction, SPM may be broadly divided into a scanning tunneling microscope (STM) which is based on utilization of electric current flowing between the probe and the sample, and an atomic force microscope (AFM) which is based on utilization of interatomic force acting between the probe and the sample.

FIG. 1 is a photograph showing a structure of a conventional scanning probe microscope (Model No.: XE-100, Park SYSTEMS, Korea), and FIG. 2 is a block diagram showing a structure of a scanning probe microscope.

Referring to FIGS. 1 and 2, SPM is operated by two steps for landing (bringing the subject into a measurable range) of a probe on a surface of the sample. Specifically, the probe is first rapidly brought to an approximate distance toward a sample (coarse motion), and the probe approached to the approximate distance is then accurately guided to the sample position (fine motion). For this purpose, two stages (coarse and fine) connected to the tip are typically employed. The probe landing using these coarse and fine motions may be broadly classified into two methods. One is a semi-automatic method where the coarse motion is carried out based on manipulation and experience of a user via an image information display device and the fine motion is then carried out in an automated manner. The other is an automated method where the probe is automatically driven until the desired condition is satisfied, by comparing a set point and a driving step of the probe via the use of a photo-sensitive device (PSD) in both the coarse and fine motion zones.

DISCLOSURE

Technical Problem

Due to direct manipulation or operation based on the empirical knowledge of a user, the semi-automatic landing has a problem in that the overall efficiency including landing speed is dependent on the proficiency of the user, selection of an optimal time point for switching from the manual mode to the automatic mode (i.e. termination point of the coarse motion zone) is determined depending on subjective criteria of the user, resulting in poor consistency, and resetting of motion regions dependent on the user's experience is required when there are changes in initial values of the sample and cantilever. Further, an inspection time is excessively long in the semi-automatic landing method, because the subjective operation or manipulation of the user is required for each measurement when the semi-automatic landing is applied to an automated test apparatus.

On the other hand, the automatic landing involves periodic comparison of the PSD signal and the set point at regular intervals for each step, irrespective of the distance between the sample and the cantilever. As compared to the semi-automatic landing method which is rapidly driven by the user in the coarse motion, the automatic landing approach disadvantageously suffers from various problems such as a long period of time to perform a landing motion, and inability to secure a regular landing time upon changes in the cantilever-sample distance, resulting from replacement of the sample or cantilever.

Therefore, the present invention has been made in view of the above problems, and it is an object of the present invention to provide an automatic landing method for a scanning probe microscope (SPM), which is capable of effectively achieving a uniform landing speed and time within a short period of time, irrespective of adverse changes in landing conditions, such as surface irregularities of samples.

It is another object of the present invention to provide an automatic landing apparatus for a scanning probe microscope (SPM), which is intended to implement the aforesaid landing method.

Technical Solution

In accordance with an aspect of the present invention, the above and other objects can be accomplished by the provision of an automatic landing method for a scanning probe microscope (SPM), comprising:

irradiating light to a cantilever using a light source;

collecting interference fringes generated by the light being diffracted from the edge of the cantilever and then being incident to a surface of the sample;

driving a tip in the sample direction until the pattern of the interference fringes reaches a predetermined pattern (first driving); and driving the cantilever in the sample direction after one interference fringe is formed (second driving).

In one embodiment of the present invention, the first driving may be carried out according to acceleration and deceleration profiles; the first driving may also be carried out by driving of the cantilever using a coarse stage connected to the cantilever; and the second driving may be carried out by using a fine stage connected to the cantilever. In the first driving step, the interference fringe collection and the tip driving may be carried out concurrently therewith, and the tip driving may be feedback-controlled using the collected interference fringe.

In another embodiment of the present invention, the tip driving may be feedback-controlled using a signal from the photo-sensitive device (PSD) in the second driving step.

In another embodiment of the present invention, the tip-sample distance may be calculated according to the following Equation 1 using the collected interference fringe and the calculated value is then provided to a user.

$$b = a \times \left[ -0.5 + \sqrt{\left\{ 0.25 + \left( 2 \times \frac{1}{\lambda \cdot a \cdot v^2} \right) \times l^2 \right\}} \right] \quad \text{(Equation 1)}$$

In Equation 1, a represents a distance between a light source and a cantilever, b represents a distance between a tip and a sample surface, λ represents a wavelength of a laser light source, 1 represents the most proximate distance between the cantilever and the interference fringe formed on the sample surface, and v represents a Fresnel number.

In accordance with another aspect of the present invention, there is provided an automatic landing apparatus for a scanning probe microscope (SPM), comprising:

a light source for irradiating light to a cantilever of the scanning probe microscope;

an image information-collecting means for collecting interference fringes generated by laser beams being diffracted from the edge of the cantilever and then being incident to a surface of a sample;

a controlling means for comparing the predetermined interference fringe pattern with the interference fringe pattern collected by the image information-collecting means, thereby determining an operational profile of the tip and then providing a driving signal of the tip to a landing means; and the landing means for driving the tip in response to the driving signal from the controlling means.

When the collected interference fringe pattern does not reach the predetermined interference fringe pattern, the controlling means may provide a first driving signal to the landing means. On the other hand, when the collected interference fringe pattern reaches the predetermined interference fringe pattern, the controlling means may provide a second driving signal to the landing means.

In another embodiment of the present invention, the first driving signal is controlled by using the collected interference fringe pattern as a feedback signal, the tip may be driven by the coarse motion stage connected to the tip, according to the first driving signal, and the tip may also be driven by the fine motion stage connected to the tip, according to the second driving signal. Further, the controlling means may calculate a distance between the tip and the sample surface, according to Equation 1 as defined before.

Advantageous Effects

The automatic landing method for a scanning probe microscope (SPM) in accordance with the present invention is very effective particularly for samples having a large surface area, because it enables automatic landing of a tip according to recognition and selection of an optimal time point for individual landing steps, irrespective of adverse changes in landing conditions, such as surface irregularities of samples. Further, the present invention enables a very inexpensive and effective application of a scanning probe microscope (SPM), because it is possible to achieve rapid and reliable driving of a tip to within an approximate distance of a sample.

DESCRIPTION OF DRAWINGS

The patent or application file contains at least one drawing executed in color. Copies of this patent or patent application publication with color drawing(s) will be provided by the Office upon request and payment of the necessary fee.

FIG. 1 is a photograph showing a structure of a conventional scanning probe microscope (SPM);

FIG. 2 is a block diagram showing a structure of a scanning probe microscope (SPM);

FIG. 3 is a flow chart illustrating a landing method for a scanning probe microscope (SPM) in accordance with the present invention;

FIG. 4 is a view illustrating formation of interference fringes on a surface of a sample in accordance with the present invention;

FIGS. 5a and 5b are schematic views illustrating a landing means of a scanning probe microscope (SPM) in accordance with the present invention;

FIG. 6 is a view illustrating a landing method for a scanning probe microscope (SPM) in accordance with one embodiment of the present invention; and FIGS. 7a through 7c and 8a through 8c are sequential views illustrating a landing method for a scanning probe microscope (SPM) in accordance with one embodiment of the present invention.

MODE FOR INVENTION

The present invention will now be described more fully with reference to the accompanying drawings hereinafter, in which preferred embodiments of the invention are shown. This invention may, however, be embodied in different forms and should not be construed as limited to the embodiments set forth herein. For convenient illustrative purposes, like numbers refer to like elements throughout the specification and drawings.

FIG. 3 is a flow chart illustrating a landing method for a scanning probe microscope (SPM) in accordance with the present invention.

Referring to FIG. 3, light is first irradiated to a cantilever using a light source. Among the light irradiated to the cantilever, the light being incident to an edge of the cantilever is diffracted and then forms interference fringes on a surface of the sample located at a distance spaced below the tip.

Next, the tip is driven in the direction of the sample (first driving). Then, a pattern of the interference fringes on the sample surface increasingly becomes convergent. In the present invention, when such a convergent interference fringe pattern reaches the predetermined interference fringe pattern zone, the first driving step is terminated and the second driving step having a different operational profile is then initiated.

Hereinafter, changes in the interference fringe pattern in accordance with the present invention will be described in more detail.

FIG. 4 is a view illustrating formation of interference fringes on a surface of the sample in accordance with the present invention.

For a better understanding, reference is made to FIG. 4. Among the light irradiated from a light source 9, the light diffracted at an edge 4a of the cantilever 4 forms interference fringes 4b to 4d on a surface of the sample. The interference fringe pattern gradually becomes convergent when a distance between the cantilever 4 and the sample 6 is decreased as they approach close to each other. In the present invention, a distance between the cantilever and the sample is measured and predicted particularly according to the pattern of the interference fringe having a maximum intensity among the interference fringe patterns formed on the sample surface, and the current state of the landing step for the SPM is identified and confirmed based on the obtained value.

In one embodiment of the present invention, the first driving and the second driving may be coarse and fine driving according to motions of the coarse stage and fine stage, respectively. Hereinafter, these driving steps will be described with reference to the accompanying drawings.

FIGS. 5a and 5b are schematic views illustrating a landing means of a scanning probe microscope (SPM) in accordance with the present invention.

Referring to FIG. 5a, it can be seen that a tip 5 is connected to a coarse stage 1 and a fine stage 2, respectively. That is, if the collected interference fringe pattern, particularly the interference fringe pattern having a maximum intensity does not reach the predetermined interference fringe pattern zone, driving of the tip is carried out by the coarse stage. Particularly in one embodiment of the present invention, in order to secure a minimized landing time while minimizing mechanical damage of the landing apparatus, the first driving of the tip is carried out according to the acceleration and deceleration profiles which involve acceleration up to maximum speed, followed by maintenance and deceleration.

Referring to FIG. 5b, when the collected interference fringe pattern, particularly the interference fringe pattern having a maximum intensity reaches the predetermined interference fringe pattern, driving of the tip enters the second driving step. In one embodiment of the present invention, the second driving of the tip is carried out by the fine stage 2 that is capable of performing sophisticated control. Therefore, in the aforesaid embodiment of the present invention, it can be said that the first driving corresponds to the coarse motion for rapid approach of the tip up to an approximate distance toward the sample, whereas the second driving corresponds to the fine motion for precise approach of the tip to the sample. For automatic identification of the coarse motion and the fine motion, the present invention employs the interference fringe pattern formed on the sample surface. However, even though a specific means of implementing landing of the tip is different from that of the present invention, it falls within the scope of the present invention, as long as such a different embodying means can implement the landing method for a scanning probe microscope, using the interference fringe pattern.

Hereinafter, the landing method for a scanning probe microscope in accordance with the present invention will be described in more detail with reference to the accompanying drawings.

FIG. 6 is a view illustrating a landing method for a scanning probe microscope (SPM) in accordance with one embodiment of the present invention.

For a better understanding, reference is made to FIG. 6. First in Step (a), the interference fringes formed on the sample surface exhibit wide divergence. In the graph of the collected interference fringes, particularly the peak with a maximum intensity exhibits a pattern deviated from the predetermined range (S.P.). In this case, the present invention carries out the first driving of the tip of the landing means according to the predetermined profile. In one embodiment of the present invention, the first driving is conducted according to acceleration and deceleration profiles of the coarse stage connected to the tip.

Thereafter, the tip is driven to access the sample, according to the predetermined acceleration and deceleration profiles. Then, the interference fringe in the divergent form gradually becomes a convergent pattern (see Step (b)). Subsequently, when the tip is continuously driven toward the sample (first driving), the collected interference fringe pattern, particularly the peak having a maximum intensity falls within the predetermined region (S.P.). Thereupon, the first driving of the tip is completed, followed by initiation of the second driving. Therefore, the present invention controls and accelerates/decelerates the first driving step by feedback of the collected interference fringe image. These acceleration/deceleration profiles may be determined and provided by a controlling means of the scanning probe microscope (SPM) which will be illustrated hereinafter.

FIGS. 7a through 7c and 8a through 8c are step-by-step views providing detailed description for a landing method for a scanning probe microscope (SPM) in accordance with one embodiment of the present invention.

Referring to FIGS. 7a through 7c, it can be seen that the interference fringe patterns formed on the sample surface gradually become convergent, when a distance between the tip and the sample surface is decreased as they approach close to each other. Then, the coarse motion is completed by a user when the collected interference fringe reaches the predetermined pattern.

Referring to FIGS. 8a through 8c, the fine motion step of the tip is initiated after the collected interference fringe pattern arrived at the predetermined pattern region. Here, the fine motion of the tip may be feedback-controlled using a PSD signal as a feedback signal.

In one embodiment of the present invention, the distance between the tip and the sample may be calculated using the collected interference fringe according to Equation 1 as hereinbefore and the calculated value is then provided to a user such that the tip-sample distance can be confirmed on a real-time basis. That is, the interference fringe collected on the sample surface not only determines the landing speed for a scanning probe microscope, but also provides a value of the tip-sample distance to a user at a reliable level.

Further, the present invention provides an automatic landing apparatus for a scanning probe microscope (SPM), comprising:

a light source for irradiating light to a cantilever of the scanning probe microscope;

an image information-collecting means for collecting interference fringes generated by laser beams being diffracted from the edge of the cantilever and then being incident to a surface of the sample;

a controlling means for comparing the predetermined interference fringe pattern with the interference fringe pattern collected by the image information-collecting means, thereby determining an operational profile of the tip and then providing a driving signal of the tip to a landing means; and the landing means for driving the tip in response to the driving signal from the controlling means.

That is, the automatic landing apparatus in accordance with the present invention includes a controlling means for determining an operational profile of the tip, based on comparison of the predetermined interference fringe pattern with the interference fringe information collected from the image information-collecting means. If the collected interference fringe pattern does not reach the predetermined interference fringe pattern, the controlling means provides a first driving signal to the landing means. On the other hand, if the collected interference fringe pattern reaches the predetermined interference fringe pattern, the controlling means provides a second driving signal to the landing means.

In the automatic landing apparatus of the present invention, the first driving signal may be controlled by using the collected interference fringe pattern as a feedback signal. Further, in one embodiment of the present invention, the tip may be driven by the coarse motion stage connected to the tip, according to the first driving signal. Consequently, the tip may be rapidly driven according to the coarse motion profile until the predetermined interference fringe pattern appears, irrespective of surface irregularities of the sample. As a result, it is possible to implement more rapid and reliable landing control, as compared to the conventional art.

Thereafter, when the collected interference fringe reaches the predetermined pattern region, the controlling means provides the second driving signal to the landing apparatus. In one embodiment of the present invention, the tip is driven in response to the second driving signal by the fine motion stage connected to the tip. As a result, it is possible to effectively reduce the period of the fine motion which requires and consumes much time, and it is also possible to achieve reliable fine motion of the tip.

The controlling means of the landing apparatus in accordance with the present invention can calculate a distance between the tip and the sample surface, using an image signal collected by the image-collecting device, according to Equation 1 as hereinbefore, followed by feedback of the calculated value to a user.

INDUSTRIAL APPLICABILITY

As apparent from the above description, the automatic landing method for a scanning probe microscope (SPM) in accordance with the present invention is very effective particularly for samples having a large surface area, because it enables automatic landing of a tip according to recognition and selection of an optimal time point for individual landing steps, irrespective of adverse changes in landing conditions, such as surface irregularities of samples. Therefore, the automatic landing method according to the present invention is applicable to SPM very effectively.

The invention claimed is:

1. A landing method for a scanning probe microscope having a cantilever, a tip connected to the cantilever and a light source located spaced above the cantilever, comprising:
    irradiating light to the cantilever using the light source;
    collecting interference fringes generated by the light being diffracted from the edge of the cantilever and then being incident to a surface of the sample;
    driving the tip in the sample direction until the pattern of the interference fringes reaches a predetermined pattern region (first driving); and
    driving the tip in the sample direction after the interference fringe pattern reaches the predetermined pattern region (second driving).

2. The method according to claim 1, wherein the first driving is carried out according to acceleration and deceleration profiles.

3. The method according to claim 1, wherein the first driving step is carried out by using a coarse stage connected to the cantilever.

4. The method according to claim 1, wherein the second driving is carried out by using a fine stage connected to the cantilever.

5. The method according to claim 1, wherein the interference fringe collection and the tip driving are carried out concurrently in the first driving step and the tip driving is feedback-controlled using the collected interference fringe.

6. The method according to claim 1, wherein the tip driving is feedback-controlled using a signal from a photo-sensitive device (PSD) in the second driving step.

7. The method according to claim 1, wherein a distance between the tip and the sample is calculated according to Equation 1 using the collected interference fringe and the calculated value is then provided to a user, $$b = a \times \left[ -0.5 + \sqrt{\left\{ 0.25 + \left( 2 \times \frac{1}{\lambda \cdot a \cdot v^2} \right) \times l^2 \right\}} \right] \quad \text{(Equation 1)}$$

wherein a represents a distance between a light source and a cantilever, b represents a distance between a tip and a sample surface, λ represents a wavelength of a laser light source, 1 represents the most proximate distance between the cantilever and the interference fringe formed on the sample surface, and v represents a Fresnel number.

8. An automatic landing apparatus for a scanning probe microscope (SPM) having a cantilever and a tip disposed below and connected to the cantilever, comprising:
    a light source for irradiating light to the cantilever of the scanning probe microscope;
    an image information-collecting means for collecting interference fringes generated by laser beams being diffracted from the edge of the cantilever and then being incident to a surface of the sample;
    a controlling means for comparing the predetermined interference fringe pattern with the interference fringe pattern collected by the image information-collecting means, thereby determining an operational profile of the tip and then providing a driving signal of the tip to a landing means; and
    the landing means for driving the tip in response to the driving signal from the controlling means.

9. The apparatus according to claim 8, wherein the controlling means provides a first driving signal to the landing means when the collected interference fringe pattern does not reach the predetermined interference fringe pattern, and the controlling means provides a second driving signal to the landing means when the collected interference fringe pattern reaches the predetermined interference fringe pattern.

10. The apparatus according to claim 9, wherein the first driving signal is controlled by using the collected interference fringe pattern as a feedback signal.

11. The apparatus according to claim 9, wherein the tip is driven in response to the first driving signal by the coarse stage connected to the tip.

12. The apparatus according to claim 9, wherein the tip is driven in response to the second driving signal by the fine stage connected to the tip.

13. The apparatus according to claim 8, wherein the controlling means calculates a distance between the tip and the sample surface, according to equation 1, $$b = a \times \left[ -0.5 + \sqrt{\left\{ 0.25 + \left( 2 \times \frac{1}{\lambda \cdot a \cdot v^2} \right) \times l^2 \right\}} \right] \quad \text{(Equation 1)}$$

wherein a represents a distance between a light source and a cantilever, b represents a distance between a tip and a sample surface, λ represents a wavelength of a laser light source, 1 represents the most proximate distance between the cantilever and the interference fringe formed on the sample surface, and v represents a Fresnel number.

* * * * *